(12) United States Patent
Chen et al.

(10) Patent No.: US 7,714,027 B2
(45) Date of Patent: May 11, 2010

(54) CROSSLINKED AROMATIC POLYMER ELECTROLYTE MEMBRANE AND METHOD FOR PRODUCING SAME

(75) Inventors: Jinhua Chen, Takasaki (JP); Yasunari Maekawa, Takasaki (JP); Masaharu Asano, Takasaki (JP); Masaru Yoshida, Takasaki (JP)

(73) Assignee: Japan Atomic Energy Agency, Ibaraki (JP)

( * ) Notice: Subject to any disclaimer, the term of this patent is extended or adjusted under 35 U.S.C. 154(b) by 146 days.

(21) Appl. No.: 12/068,036

(22) Filed: Jan. 31, 2008

(65) Prior Publication Data
US 2008/0312350 A1 Dec. 18, 2008

(51) Int. Cl.
*C08J 5/20* (2006.01)
(52) U.S. Cl. ........................................ 521/27
(58) Field of Classification Search ............... 521/27
See application file for complete search history.

(56) References Cited

U.S. PATENT DOCUMENTS

| | | | |
|---|---|---|---|
| 5,362,836 A | 11/1994 | Helmer-Metzmann et al. | |
| 5,403,675 A | 4/1995 | Ogata et al. | |
| 5,643,968 A * | 7/1997 | Andreola et al. | 521/27 |
| 6,214,891 B1 * | 4/2001 | Schneller et al. | 521/27 |
| 7,462,223 B2 * | 12/2008 | Kiefer et al. | 96/4 |
| 2002/0103327 A1 | 8/2002 | Claub et al. | |
| 2003/0069386 A1 | 4/2003 | Clauss et al. | |
| 2004/0198849 A1 * | 10/2004 | Aminabhavi et al. | 521/27 |
| 2005/0131196 A1 | 6/2005 | Clauss | |

FOREIGN PATENT DOCUMENTS

| | | |
|---|---|---|
| JP | 11-502245 | 2/1999 |
| JP | 2001-348439 | 12/2001 |
| JP | 2004-288497 | 10/2004 |
| JP | 2004-346163 | 12/2004 |
| JP | 2006-012791 | 1/2006 |
| JP | 2006-049202 | 2/2006 |
| JP | 2006-066174 | 3/2006 |

\* cited by examiner

*Primary Examiner*—Bernard Lipman

(57) ABSTRACT

An aromatic polymer film substrate, or a grafted aromatic polymer film substrate having a monomer introduced therein as graft chains is irradiated with ionizing radiation to impart a crosslinked structure. The aromatic polymer film substrate or the grafted aromatic polymer film substrate, provided with the crosslinked structure, is directly sulfonated to obtain a crosslinked aromatic polymer electrolyte membrane. The crosslinked aromatic polymer electrolyte membrane has low water uptake, high proton conductivity, low methanol permeability, high chemical stability, and excellent mechanical characteristics. A method for producing the crosslinked aromatic polymer electrolyte membrane is also provided.

4 Claims, No Drawings

CROSSLINKED AROMATIC POLYMER ELECTROLYTE MEMBRANE AND METHOD FOR PRODUCING SAME

BACKGROUND OF THE INVENTION

1. Field of the Invention

This invention relates to a crosslinked aromatic polymer electrolyte membrane which is suitable for use in a polymer electrolyte fuel cell, and which has low water uptake, high proton conductivity, low methanol permeability, high chemical stability, and excellent mechanical characteristics; and a method for producing the crosslinked aromatic polymer electrolyte membrane.

2. Description of the Related Art

A fuel cell using a polymer electrolyte membrane is operated at a temperature of as low as 150° C., and has a high power efficiency and a high energy density. Thus, such a fuel cell is expected to serve as a power source for mobile instruments, a power source for cogeneration stationary systems, or a power source for fuel cell vehicles (automobiles), which utilizes methanol, hydrogen or the like as a fuel.

In connection with the fuel cell, important component technologies on polymer electrolyte membranes, electrocatalysts, gas-diffusion electrodes, and membrane-electrode assemblies are existent. Development of a polymer electrolyte membrane having excellent characteristics for use in the fuel cell is one of the most important technologies.

In the polymer electrolyte fuel cell, the polymer electrolyte membrane acts as an "electrolyte" for conducting hydrogen ions (protons), and also acts as a "separator" for preventing direct mixing of hydrogen or methanol, as a fuel, with oxygen. The polymer electrolyte membrane is required to have high proton conductivity; excellent chemical stability ensuring long-term durability, especially, resistance to hydroxide radicals becoming a main cause of membrane deterioration (i.e., chemical stability); long-term thermal durability at the operating temperature of the cell, or at even higher temperatures; and constant and high water retention properties of the membrane for keeping proton conductivity high. To play the role of the separator, the polymer electrolyte membrane is required to be excellent in the mechanical strength and dimensional stability, and to have low permeability to hydrogen, methanol and oxygen.

A perfluorosulfonic polymer electrolyte membrane "Nafion (registered trademark of DuPont)" developed by DuPont, for example, has generally been used as the electrolyte membrane for the polymer electrolyte fuel cell. Perfluorinated polymer electrolyte membranes of the related art, such as Nafion, are excellent in chemical durability and stability. However, their water retention properties are insufficient at high temperatures and low humidity. Thus, the drying of the ion exchange membranes occurs, resulting in decreased proton conductivity. They are also disadvantageous in that when methanol is used as a fuel, swelling of the membrane or crossover of methanol takes place.

They have also been defective in that their mechanical characteristics under operating conditions involving temperatures exceeding 100° C., required for an automobile power source, markedly decline. Furthermore, the production of the perfluorinated polymer electrolyte membranes starts with the synthesis of fluorine-based monomers. Thus, the manufacturing process is so complex that a high cost is entailed. These have been a great impediment to the commercialization of these polymer electrolyte membranes-based fuel cells as power sources for stationary cogeneration systems or power sources for fuel cell vehicles.

Under these circumstances, the development of a low-cost polymer electrolyte membrane replacing the perfluorinated polymer electrolyte membrane has been energetically carried out. For example, attempts have been made to prepare partially fluorinated polymer electrolyte membranes by introducing styrene monomers into fluoropolymer films, such as polytetrafluoroethylene (PTFE), poly(vinylidene fluoride) (PVDF), and ethylene-tetrafluoroethylene copolymer (ETFE), by graft polymerization, and then sulfonating the graft polymers (see, for example, JP-A-2001-348439 and JP-A-2004-246376).

However, the fluoropolymer films have a low glass transition temperature, so that their mechanical strength at high temperatures of 100° C. or higher considerably declines. When a high electric current is flowed through the electrolyte membrane for a long time, moreover, the sulfonic acid groups introduced into the polystyrene graft chains become detached, resulting in the marked lowering of the proton conductivity of the electrolyte membrane. There is also the defect that crossover of hydrogen, as the fuel, or oxygen occurs.

On the other hand, an aromatic polymer electrolyte membrane has been proposed as a low-cost hydrocarbon-based polymer electrolyte membrane (see, for example, U.S. Pat. No. 5,403,675). Since the aromatic polymer electrolyte membrane has excellent mechanical strength at high temperatures and low fuel permeability to methanol, hydrogen, oxygen or the like, its use at high temperatures is expected.

The aromatic polymer electrolyte membrane is prepared by dissolving an aromatic polymer material, typified by an engineering plastic, in a sulfonating solution such as concentrated sulfuric acid or chlorosulfonic acid to sulfonate the aromatic polymer, and then forming a solution of the sulfonated aromatic polymer into a membrane by casting (see, for example, JP-T-11-502245 and JP-A-06-049202).

The aromatic polymer electrolyte membrane is also obtained by the polymerization of an aromatic monomer having sulfonic acid groups bound thereto, and then forming the resulting polymer into a membrane (See, for example, JP-A-2004-288497, JP-A-2004-346163, and JP-A-2006-12791).

The aromatic polymer electrolyte membrane has excellent characteristics at high temperatures, so that its use at high temperatures is expected. However, the methods for preparing the aromatic polymer electrolyte membranes disclosed in JP-T-11-502245, JP-A-06-049202, JP-A-2004-288497, JP-A-2004-346163, and JP-A-2006-12791 use large amounts of strong acids for the purpose of dissolving the aromatic polymer materials, and thus use large amounts of diluting water in order to precipitate the sulfonated materials. As noted here, these methods require complicated steps. Moreover, the membrane-forming process by casting needs large amounts of organic solvents.

The electrolyte membranes prepared as above have no crosslinked structure. If the degree of sulfonation is high, or the temperature is heightened, therefore, problems occur, such as dissolution in water, or considerable dimensional changes or marked decreases in strength, due to absorption of water. As noted here, the electrolyte membranes do not possess mechanical strength which enables the shape of the electrolyte membrane to be maintained under the cell operating conditions.

Furthermore, the sulfonic acid groups exist randomly in the aromatic polymer chains, thus resulting in unclear separation between a hydrophobic layer for maintaining mechanical strength and an electrolyte layer in charge of proton conduction. Hence, proton conductivity, fuel impermeability, and chemical stability are insufficient.

The present invention has been accomplished in the light of the above-described problems. It is an object of the invention to provide an aromatic polymer electrolyte membrane which does not cause a problem, such as dissolution in water, or a considerable dimensional change or a marked decrease in strength, due to absorption of water, which possesses mechanical strength enabling the shape of the electrolyte membrane to be maintained under the cell operating conditions, and which is sufficient in proton conductivity, fuel impermeability, and chemical stability.

It is another object of the invention to provide a method for producing the aromatic polymer electrolyte membrane, which does not need complicated steps, can markedly reduce the cost of production, and obviates the need for a membrane-forming step by casting.

SUMMARY OF THE INVENTION

A first aspect of the present invention is a crosslinked aromatic polymer electrolyte membrane comprising an aromatic polymer film substrate having a crosslinked structure imparted thereto, the aromatic polymer film substrate having sulfonic acid groups introduced into aromatic rings thereof.

The aromatic polymer film substrate can be a homopolymer, or can have a structure having a monomer grafted to the polymer.

The monomer can be at least one monomer selected from the group consisting of aromatic vinyl compounds such as styrene, acrylic acid and its derivatives, acrylamides, vinylketones, acrylonitriles, vinyl fluoride-based compounds, and multifunctional monomers.

The aromatic polymer film substrate can be any of polyether ketones, polyimides, polysulfones, polyesters, polycarbonates, polyphenylene sulfides, and polybenzimidazoles, or a composite containing any of these polymers.

A multiple-crosslinked structure can be possessed as the crosslinked structure.

A second aspect of the present invention is a method for producing a crosslinked aromatic polymer electrolyte membrane, which comprises irradiating an aromatic polymer film substrate with ionizing radiation to impart a crosslinked structure to the aromatic polymer film substrate, and then sulfonating the crosslinked aromatic polymer film substrate to produce a crosslinked aromatic polymer electrolyte membrane having sulfonic acid groups introduced into aromatic rings of the crosslinked aromatic polymer film substrate.

The crosslinked aromatic polymer electrolyte membrane is heat-treated, whereby a multiple-crosslinked structure can be imparted to the crosslinked aromatic polymer electrolyte membrane.

The crosslinked aromatic polymer electrolyte membrane of the present invention has low water uptake, high proton conductivity, low methanol permeability, high chemical stability, and excellent mechanical characteristics. Thus, it can be expected to provide a polymer electrolyte membrane optimal for a fuel cell for mobile instruments, a fuel cell for stationary cogeneration systems, or a fuel cell for automobiles, which utilizes methanol, hydrogen or the like as a fuel. The polymer electrolyte membrane is suitable, particularly, for use in a fuel cell for stationary cogeneration system, which is desired to have a long-term durability, or a fuel cell for automobiles which withstands use at high temperatures of 100° C. or higher.

According to the method for producing the crosslinked aromatic polymer electrolyte membrane of the present invention, a highly crosslinked structure is imparted beforehand to the aromatic polymer film substrate, or the monomer-grafted aromatic polymer film substrate. Thus, the film substrate can be sulfonated directly in the sulfonating solution. Compared with the methods of the related art including the complicated waste acid treating and membrane-forming steps, therefore, the cost of manufacturing can be markedly reduced. Moreover, the microphase-separated structure of the polymer electrolyte membrane can be designed by selecting the film substrate within a wide range, controlling the degree of sulfonating, or controlling the degree of grafting.

DETAILED DESCRIPTION OF THE INVENTION

The crosslinked aromatic polymer electrolyte membrane of the present invention can be prepared, for example, by introducing a crosslinked structure into an aromatic polymer film substrate, or the film substrate having a monomer graft-polymerized therewith, by irradiation with ionizing radiation, and then introducing sulfonic acid groups into aromatic rings of the aromatic polymer chains and/or graft chains of the crosslinked film substrate directly by a sulfonation reaction. Details of this preparation will be described in detail below.

Aromatic Polymer Film Substrate:

The aromatic polymer film substrate usable in the present invention may be any film, without restriction, as long as it is an aromatic polymer film crosslinkable by means of ionizing radiation (for example, a film of any of polyether ketones, polyimides, polysulfones, polyesters, polyamides, polycarbonates, polyphenylene sulfides, and polybenzimidazoles), a composite film containing any of these aromatic polymers, or a graft film having a monomer grafted to any of the aromatic polymers. The aromatic polymer film substrate can be converted into a polymer electrolyte membrane having proton conductivity by introducing proton-conducting sulfonic acid groups by the sulfonation reaction of aromatic rings contained in the aromatic polymer film substrate.

Polyether ether ketone is preferred as an example of the polyether ketones, since it is capable of monomer graft polymerization and crosslinking by ionizing radiation (or ionizing radiation crosslinking), and the resulting crosslinked aromatic polymer electrolyte membrane has low water uptake, high proton conductivity, low methanol permeability, high chemical stability, and excellent mechanical characteristics.

Polyether imide is preferred as an example of the polyimides, since it is capable of monomer graft polymerization and ionizing radiation crosslinking, and the resulting crosslinked aromatic polymer electrolyte membrane has low water uptake, high proton conductivity, low methanol permeability, high chemical stability, and excellent mechanical characteristics.

Polysulfone is preferred as an example of the polysulfones, since it is capable of monomer graft polymerization and ionizing radiation crosslinking, and the resulting crosslinked aromatic polymer electrolyte membrane has low water uptake, high proton conductivity, low methanol permeability, high chemical stability, and excellent mechanical characteristics.

Polyethylene naphthalate or liquid crystal polymer (LCP) is preferred as an example of the polyesters, since these polymers are each capable of monomer graft polymerization and ionizing radiation crosslinking, and the resulting crosslinked aromatic polymer electrolyte membrane has low water uptake, high proton conductivity, low methanol permeability, high chemical stability, and excellent mechanical characteristics.

Ionizing Radiation Crosslinking:

The term "ionizing radiation crosslinking", as used herein, refers to introducing a crosslink between the aromatic polymer chains, between the aromatic polymer chain and the grafted molecular chain, or between the grafted molecular chains, of the aromatic polymer film substrate, by irradiation with ionizing radiation. By imparting the crosslinked structure, the aromatic polymer film substrate is insolubilized in most solutions, including sulfonating solutions, and organic solvents. As a result, sulfonation reaction can be performed, with the shape of the aromatic polymer film substrate being retained. Thus, the aromatic polymer film substrate can be directly transformed into the electrolyte membrane. Furthermore, the aromatic polymer electrolyte membrane provided with the crosslinked structure has its water containing properties suppressed markedly, thus exhibiting high chemical stability and excellent mechanical strength which are required of a polymer electrolyte membrane for a fuel cell.

The impartation of the crosslinked structure to the aromatic polymer film substrate or the monomer-grafted aromatic polymer film substrate is carried out by utilizing reaction between active sites, such as radicals, generated on the aromatic polymer chains by ionizing radiation. Thus, the ionizing radiation is not limited to a particular radiation, as long as it is an energy source which causes the reaction for generating activated species, such as radicals, on the polymer chains. Examples of the ionizing radiation are gamma rays, electron-beams, an ion beam, and X-rays.

The ionizing radiation is thrown onto the aromatic polymer film substrate or the monomer-grafted aromatic polymer film substrate at an absorbed dose of 0.5 to 200 MGy at room temperature to 350° C. under vacuum, under an inert gas or in the presence of oxygen. By so doing, the crosslinked structure is imparted. As a yardstick of the crosslinking density, the gel percent of the aromatic polymer is named. The gel percent is defined as the proportion, to the total weight, of the insolubles weight of the polymer in a good solvent for the aromatic polymer.

In the present invention, if the gel percent reaches 50% or higher, the shape of the aromatic polymer film substrate can be retained during the sulfonation reaction, and a crosslinked aromatic polymer electrolyte membrane insoluble in water or an organic solution is obtained. The necessary crosslinking radiation dose varies with the type of the aromatic polymer film substrate. In the case of a polyether ether ketone film substrate, for example, less than 40 MGy is not sufficient to reach a gel percent of 50%. Thus, the mechanical strength of the resulting crosslinked aromatic polymer electrolyte membrane is so low that the electrolyte membrane is difficult to use as an electrolyte membrane for a fuel cell. A value of more than 100 MGy results in the embrittlement of the resulting electrolyte membrane. With the polyether ether ketone, therefore, irradiation at a crosslinking radiation dose of 40 to 100 MGy is preferred.

Radicals generated in the presence of oxygen partially become a peroxide structure. Thus, it is more preferred for the irradiation atmosphere to be under vacuum or in an inert gas. Irradiation at a high temperature can accelerate the crosslinking by ionizing radiation, so that a high gel percent can be achieved with a lower radiation dose. By heat-treating the irradiated sample at 80° C. or higher, the residual radicals are bound together, and the crosslinking effect is enhanced. Hence, heat treatment lasting 2 to 24 hours at 80 to 250° C. under vacuum is even more preferred.

Graft-Polymerized Monomer:

In the present invention, the monomer graft-polymerized with the aromatic polymer film substrate includes, for example, aromatic vinyl compounds such as styrene, acrylic acid and its derivatives, acrylamides, vinylketones, acrylonitriles, vinyl fluoride-based compounds, or multifunctional monomers. This is because graft chains can be sulfonated in the resulting grafted aromatic polymer film, and the graft chains can be crosslinked to each other by irradiation with ionizing radiation.

The aromatic vinyl compounds such as styrene can be represented by the following general formula (A):

where X represents —H, —$CH_3$, —$CH_2CH_3$, —OH, —Cl, —F, —Br or —I, and Y represents —H, —$CH_3$, —$CH_2CH_3$, —$CH_2CH_2CH_3$, —$C(CH_3)_3$, —$OCH_3$, —$OCH_2CH_3$, —$OCH_2CH_2CH_3$, —$OC(CH_3)_3$, —$CH_2Cl$, —CN, —$SO_3CH_3$, —$Si(OCH_3)_3$, —$Si(OCH_2CH_3)_3$, —CH=$CH_2$, —OCH=$CH_2$, —C≡CH, —OH, —Cl, —F, or —Br.

The acrylic acid and its derivatives can be represented by the following general formula (B):

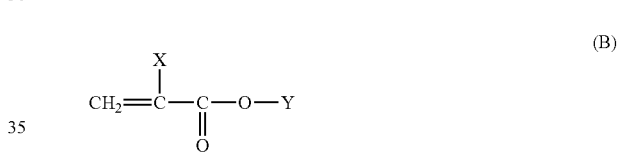

where X represents —H, —$CH_3$, —$CH_2CH_3$, —OH, —Cl, —F, —Br or —I, and Y represents —H, —$CH_3$, —$CH_2CH_3$, —$CH_2CH_2CH_3$, —$C(CH_3)_3$, —$CH_2Cl$, —$Si(OCH_3)_3$, —$Si(OCH_2CH_3)_3$, or a benzene ring.

The acrylamides can be represented by the following general formula (C):

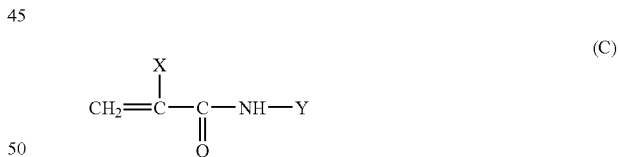

where X represents —H, —$CH_3$, —$CH_2CH_3$, —OH, —Cl, —F, —Br or —I, and Y represents —H, —$CH_3$, —$CH_2CH_3$, —$CH_2CH_2CH_3$, —$C(CH_3)_3$, —$CH_2Cl$, or a benzene ring.

The vinylketones can be represented by the following general formula (D):

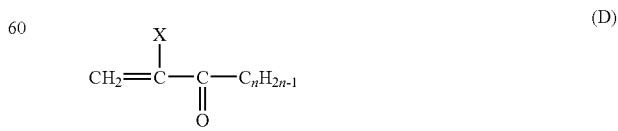

where X represents —H, —$CH_3$, —$CH_2CH_3$, —OH, —Cl, —F, —Br, or —I, and n denotes an integer of 1 to 5.

Examples of the nitriles are acrylonitrile ($CH_2$=CHCN) and methacrylonitrile [$CH_2$=C($CH_3$)CN].

Examples of the vinyl fluoride-based compounds are $CF_2$=CF—$C_6H_5$, $CF_2$=CF—O—$(CF_2)_n$—$SO_2F$, $CF_2$=CF—O—$CF_2$—CF($CF_3$)—O—$(CF_2)_n$—$SO_2F$, $CF_2$=CF—$SO_2F$, $CF_2$=CF—O—$(CH_2)_n$—X, $CH_2$=CH—O—$(CF)_n$—X, $CF_2$=CF—O—$(CF_2)_n$—X, $CF_2$=CF—O—$CF_2$—CF($CF_3$)—O—$(CF_2)_n$—X, $CF_2$=CF—O—$(CH_2)_n$—$CH_3$, $CH_2$=CH—O—$(CF_2)_n$—$CF_3$, $CF_2$=CF—O—$(CF_2)_n$—$CF_3$, and $CF_2$=CF—O—$CF_2$—CF($CF_3$)—O—$(CF_2)_n$—$CF_3$. (In these formulas, n denotes an integer of 1 to 5, and X represents a halogen atom, specifically, chlorine or fluorine.)

The multifunctional monomers are not limited, as long as they have a structure which can impart a crosslink to graft chains in a graft reaction. Examples of the multifunctional monomers are bis(vinylphenyl)ethane, divinylbenzene, 2,4,6-triallyloxy-1,3,5-triazine (i.e., triallyl cyanurate), triallyl-1,2,4-benzenetricarboxylate (i.e., triallyl trimellitate), diallyl ether, bis(vinylphenyl)methane, divinyl ether, 1,5-hexadiene, and butadiene. By graft-polymerizing the multifunctional monomer, a crosslinked structure can be imparted between graft chains. The multifunctional monomer is preferably used in a proportion by weight of 10% or less in all the monomers. If more than 10% of the multifunctional monomer is used, the resulting polymer electrolyte membrane becomes brittle.

Graft Polymerization:

In the present invention, graft polymerization of the monomer with the aromatic polymer film substrate is performed by utilizing graft active sites, such as radicals generated in the aromatic polymer film substrate, by ionizing radiation. By controlling the degree of grafting, a crosslinking effect in a subsequent ionizing radiation crosslinking step, and a sulfonating effect in a sulfonation step are provided. The degree of grafting is preferably 0 to 200% by weight, more preferably 0 to 80% by weight, based on the aromatic polymer film substrate. A degree of grafting of more than 200% by weight results in the failure to obtain the mechanical strength of the grafted aromatic polymer film substrate suitable for a fuel cell.

Sulfonation Reaction:

In the present invention, the crosslinked structure is imparted to the aromatic polymer film substrate, or the monomer-grafted aromatic polymer film substrate, whereby the aromatic polymer film substrate becomes insoluble in most solutions, including a sulfonating solution, and organic solvents. As a result, sulfonation reaction can take place, with the shape of the aromatic polymer film substrate being retained. Consequently, a crosslinked aromatic polymer electrolyte membrane having excellent performance, which is directly applied to a fuel cell, can be obtained from the aromatic polymer film substrate. Hence, it becomes possible to use concentrated sulfuric acid, fuming sulfuric acid, and halogen-based organic solutions of chlorosulfonic acid (dichloroethane solution, chloroform solution, etc.) which have been unusable, because the aromatic polymer film substrate, or the monomer-grafted aromatic polymer film substrate, if without the crosslinked structure, dissolves during the reaction.

Ion Exchange Capacity:

The polymer electrolyte membrane acts upon the proton dissociation properties of the sulfonic acid groups introduced into the film substrate by sulfonation. The amount of the sulfonic acid groups is defined as the ion exchange capacity (unit: mmol/g) which is the number of millimols of the sulfonic acid groups in 1 g of the dry electrolyte membrane. The ion exchange capacity of the polymer electrolyte membrane can be controlled according to the sulfonation conditions (sulfonating reagent, type of the solvent, sulfonation time, temperature) and the degree of grafting of the grafted polymer membrane. To prepare a crosslinked aromatic polymer electrolyte membrane having low water uptake and high proton conductivity, the ion exchange capacity is preferably adjusted to 0.5 to 3.0 mmol/g. It is more preferably 0.8 to 1.6 mmol/g. At less than 0.5 mmol/g, it is difficult to obtain practical proton conductivity. If the ion exchange capacity exceeds 3.0 mmol/g, however, high water uptake results, leading to a noticeable decline in mechanical strength.

Multiple-Crosslinked Structure:

Upon heat treatment of the crosslinked aromatic polymer electrolyte membrane after sulfonation, a further crosslinked structure can be introduced onto the graft chain, thus resulting in the enhancement of the mechanical strength and thermal stability. For the efficient introduction of a heat-crosslinked structure represented by the general formula (E) shown below, the heat treatment is performed preferably for 0 to 24 hours at room temperature to 300° C. The thermal crosslinking reaction proceeds efficiently within the range of the glass transition temperature (Tg) of the aromatic polymer film substrate to Tg+50° C. Thus, the heat treatment conditions are more preferably as follows: Under vacuum, 120 to 250° C., 1 to 12 hours.

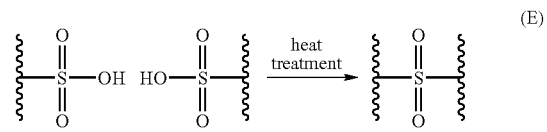

(E)

Thickness of Polymer Electrolyte Membrane:

In the present invention, in order to lower the resistance of the polymer electrolyte membrane for a fuel cell, it is conceivable to thin the polymer electrolyte membrane. Under the current circumstances, an excessively thin polymer electrolyte membrane is easily broken, and the membrane itself is difficult to produce. Thus, the crosslinked aromatic polymer electrolyte membrane has a thickness of preferably 15 to 200 μm, and more preferably 20 to 100 μm.

EXAMPLES

The present invention will now be described in detail by Examples and Comparative Examples, which in no way limit the invention.

The degree of grafting (%), ion exchange capacity (mmol/g), water uptake (%), proton conductivity (S/cm), methanol permeability ($10^{-6}$ $cm^2$/s), chemical stability (weight remaining rate), and tensile strength (MPa) were evaluated as the characteristics of each polymer electrolyte membrane. The measured values were obtained by measurements described below. If the mechanical strength of the resulting electrolyte membrane was too low to prepare a sample for measurement, an evaluation "Not measurable" was made.

(1) Degree of Grafting (%)

Let the polymer film substrate be a main chain portion, and the portion graft-polymerized with the monomer be a graft chain portion. Then, the weight ratio of the graft chain portion to the main chain portion is expressed as a degree of grafting which satisfies the following equation (Grafting (wt. %)):

Grafting=100×(Wg−Wo)/Wo

Wo: Weight (g) in dry state before grafting
Wg: Weight (g) in dry state after grafting (2) Ion Exchange Capacity (mmol/g)

The ion exchange capacity (IEC) of the polymer electrolyte membrane is represented by the following equation:

IEC=n/Wm n: Amount (mmol/g) of sulfonic acid groups in polymer electrolyte membrane
Wm: Dry weight (g) of polymer electrolyte membrane The measurement of n was made by immersing the polymer electrolyte membrane in a 1M sulfuric acid solution for 4 hours at 50° C. to convert it into a proton type (H-type) completely, then washing the polymer electrolyte membrane with deionized water until pH=6 to 7, removing the free acid completely, then immersing the polymer electrolyte membrane in a saturated aqueous solution of NaCl for 24 hours to perform ion exchange, thereby liberating the proton $H^+$, and then acid-base titrating the electrolyte membrane and its aqueous solution with 0.02M NaOH to determine the amount of the sulfonic acid groups of the polymer electrolyte membrane as the amount of protons $H^+$, n=0.02 V (V: volume (ml) of 0.02M NaOH used in the titration).

(3) Water Uptake (%)

At 80° C., the H-type polymer electrolyte membrane preserved for 24 hours in water was withdrawn. That is, water on its surface was lightly wiped off, whereafter the wet weight Ww was measured. This membrane was dried in a vacuum for 16 hours at 60° C., and then measured for weight, whereby the dry weight Wd of the polymer electrolyte membrane was determined. The water uptake was calculated from the following equation based on Ww and Wd:

Water uptake=100(Ww−Wd)/Wd (4) Proton Conductivity (S/cm)

At room temperature, the H-type polymer electrolyte membrane preserved in water was withdrawn. That is, the polymer electrolyte membrane was sandwiched between platinum electrodes, and the membrane resistance due to impedance was measured. The proton conductivity of the polymer electrolyte membrane was calculated using the following equation:

κ=d/(Rm·S)

κ: Proton conductivity (S/cm) of polymer electrolyte membrane
d: Distance (cm) between platinum electrodes
Rm: Resistance (Ω) of polymer electrolyte membrane
S: Cross-sectional area ($cm^2$) for electric flow of polymer electrolyte membrane in measurement of resistance (5) Test for Evaluation of Methanol Permeability The methanol permeability at 80° C. was determined by diffusion experiments using an H-type diffusion cell. The water side of the cell was 100 mL in volume, and the methanol side of the cell was charged with 100 mL of an aqueous solution of methanol having a concentration of 10M. A permeation port of the H-type cell, where the electrolyte membrane was interposed, was in a circular form with a diameter of 2 cm. The system was stabilized at 80° C. with stirring, and the methanol concentration was measured at constant time intervals. The methanol permeability was evaluated based on the results obtained.

$$P = \frac{V \times d}{(M_{MeOH} - M_{H_2O}) \times S} \times \frac{dM_{H_2O}}{dt}$$

P: Methanol permeability coefficient ($cm^2/s$) of polymer electrolyte membrane
V: Volume ($cm^3$) of water
d: Thickness (cm) of polymer electrolyte membrane
$M_{MeOH}$: Concentration of methanol solution in time t (seconds)
$M_{H_2O}$: Methanol concentration in aqueous solution in time t (seconds)

(6) Chemical Stability (Weight Remaining Rate, %)

The weight of the polymer electrolyte membrane after drying under vacuum for 16 hours at 60° C. was designated as $W_3$, and the dry weight of the electrolyte membrane after immersion for 24 hours in a 3% solution of hydrogen peroxide at 80° C. was designated as $W_4$. The chemical stability was determined by the following equation:

Chemical stability=100($W_4/W_3$)(%)

(7) Mechanical Strength

The tensile strength (MPa), as the mechanical strength of the polymer electrolyte membrane, was measured using a dumbbell specimen in accordance with JIS K7127 at room temperature (about 25° C.) and humidity RH of 50%.

Example 1

A 6 cm×20 cm polyether ether ketone (hereinafter referred to as PEEK) film substrate (thickness 25 μm) was fixed to an irradiation stand. In this state, the PEEK film substrate was irradiated with electron-beams (30 mA, voltage 1 MV) for 50 minutes at a radiation dose of 100 MGy. Then, the PEEK film substrate was allowed to stand in a vacuum for 24 hours at 200° C. A crosslinked film substrate obtained in this manner was insoluble in concentrated sulfuric acid. On the other hand, an untreated PEEK film substrate rapidly dissolved in concentrated sulfuric acid. The crosslinked PEEK film substrate was allowed to stand in a 1,2-dichloroethane solution of 0.2M chlorosulfonic acid for 24 hours at 0° C., and then hydrolyzed by washing with water, to obtain a crosslinked aromatic polymer electrolyte membrane. The ion exchange capacity, water uptake, proton conductivity, methanol permeability, chemical stability, and tensile strength of the crosslinked aromatic polymer electrolyte membrane obtained in the present Example are shown in Table 1.

TABLE 1

Characteristics of the polymer electrolyte membrane

| | Degree of grafting (%) | Ion exchange capacity (mmol/g) | Water uptake (%) | Proton conductivity (S/cm) | Methanol permeability ($10^{-6}$ cm$^2$/s) | Chemical stability (weight remaining rate) | Tensile strength (MPa) |
|---|---|---|---|---|---|---|---|
| Ex. 1 | — | 1.5 | 51 | 0.092 | 1.96 | 93 | 58 |
| Ex. 2 | — | 1.1 | 29 | 0.051 | 1.23 | 96 | 52 |
| Ex. 3 | 37 | 1.89 | 57 | 0.19 | 1.58 | 94 | 42 |
| Ex. 4 | 37 | 1.19 | 27 | 0.058 | 0.34 | 100 | 63 |
| Ex. 5 | 43 | 1.23 | 31 | 0.066 | 0.54 | 99 | 57 |
| Comp. Ex. 1 | Preparation of electrolyte membrane was impossible, because the film substrate rapidly dissolved in the sulfonating solution | | | | | | |
| Comp. Ex. 2 | 37 | 1.93 | 197 | 0.083 | Not measurable | 51 | Not measurable |
| Comp. Ex. 3 | 43 | 1.67 | 216 | 0.096 | Not measurable | 67 | Not measurable |
| Comp. Ex. 4 | — | 0.91 | 32 | 0.063 | 8.84 | 100 | 37 |

Example 2

A crosslinked aromatic polymer electrolyte membrane obtained by the same procedure as in Example 1 was further heat-treated in a vacuum for 2 hours at 180° C. This measure resulted in the reaction of some of the sulfonic acid groups, obtaining a multiple-crosslinked aromatic electrolyte membrane having a sulfone group-crosslinked structure. The ion exchange capacity, water uptake, proton conductivity, methanol permeability, chemical stability, and tensile strength of the multiple-crosslinked aromatic polymer electrolyte membrane obtained in the present Example are shown in Table 1.

Example 3

A 2 cm×3 cm polyether ether ketone (hereinafter referred to as PEEK) film substrate (thickness 25 μm) was placed in a separable glass container with a cock, and deaerated therein, whereafter the interior of the glass container was purged with an argon gas. In this state, the PEEK film substrate was irradiated with γ-rays from a $^{60}$Co radiation source at a radiation dose of 30 kGy at room temperature. Then, 20 g of a 1-propanol solution of 50 wt. % styrene, which had been deaerated by bubbling an argon gas, was added into the glass container so that the irradiated PEEK film substrate would be immersed. After purging with an argon gas, the glass container was hermetically sealed, and allowed to stand for 24 hours at 80° C. The resulting graft polymer film substrate was washed with cumene. The degree of grafting was calculated from the weight of the film substrate after drying. This graft film substrate was subjected to electron-beam crosslinking and sulfonation under the same conditions as in Example 1 to obtain a crosslinked aromatic polymer electrolyte membrane. The degree of grafting, ion exchange capacity, water uptake, proton conductivity, methanol permeability, chemical stability, and tensile strength of the crosslinked aromatic polymer electrolyte membrane obtained in the present Example are shown in Table 1.

Example 4

A crosslinked aromatic polymer electrolyte membrane obtained by the same procedure as in Example 3 was further heat-treated in a vacuum for 2 hours at 180° C. This treatment resulted in the reaction of some of the sulfonic acid groups, obtaining a multiple-crosslinked aromatic polymer electrolyte membrane having a sulfone group-crosslinked structure. The degree of grafting, ion exchange capacity, water uptake, proton conductivity, methanol permeability, chemical stability, and tensile strength of the multiple-crosslinked aromatic polymer electrolyte membrane obtained in the present Example are shown in Table 1.

Example 5

A 2 cm×3 cm polyether imide (hereinafter referred to as PEI) film substrate (thickness 50 μm) was placed in a separable glass container with a cock, and deaerated therein, whereafter the interior of the glass container was purged with an argon gas. In this state, the PEI film substrate was irradiated with γ-rays from a $^{60}$Co radiation source at a radiation dose of 30 kGy at room temperature. Then, 20 g of a 1-propanol solution of 50 wt. % styrene, which had been deaerated by bubbling an argon gas, was added into the glass container so that the irradiated PEI film substrate would be immersed. After purging with an argon gas, the glass container was hermetically sealed, and allowed to stand for 24 hours at 80° C. The resulting graft polymer film substrate was washed with cumene. The degree of grafting was calculated from the weight of the film substrate after drying. This grafted PEI film substrate was fixed to an irradiation stand and, in this state, irradiated with electron-beams (30 mA, voltage 1 MV) for 10 minutes at a radiation dose of 20 MGy. Then, the grafted PEI film substrate was allowed to stand in a 1,2-dichloroethane solution of 0.2M chlorosulfonic acid for 24 hours at 0° C., and then hydrolyzed by washing with water, to obtain a crosslinked aromatic polymer electrolyte membrane. The resulting crosslinked aromatic polymer electrolyte membrane was heat-treated in a vacuum under the same conditions as in Example 4. The degree of grafting, ion exchange capacity, water uptake, proton conductivity, methanol permeability, chemical stability, and tensile strength of the crosslinked aromatic polymer electrolyte membrane obtained in the present Example are shown in Table 1.

Comparative Example 1

A 2 cm×3 cm PEEK film substrate (25 μm) was treated under the same sulfonation conditions as in Example 1, without crosslinking by ionizing radiation. This film substrate completely dissolved in the reaction solution, failing to provide an aromatic polymer electrolyte membrane.

Comparative Example 2

A 2 cm×3 cm PEEK film substrate (25 μm) was subjected to the same method as in Example 3 to introduce styrene graft chains into it. The graft film substrate was treated under the same sulfonation conditions as in Example 3, without crosslinking by ionizing radiation. An aromatic polymer electrolyte membrane obtained in this manner had low mechanical strength, and had difficulty in maintaining a membranous shape. The degree of grafting, ion exchange capacity, water uptake, proton conductivity, methanol permeability, and chemical stability of the aromatic polymer electrolyte membrane obtained in the present Comparative Example are shown in Table 1.

Comparative Example 3

A 2 cm×3 cm PEI film substrate (50 μm) was subjected to the same method as in Example 5 to introduce styrene graft chains into it. The graft film substrate was treated under the same sulfonation conditions as in Example 3, without crosslinking by ionizing radiation. An aromatic polymer electrolyte membrane obtained in this manner had low mechanical strength, and had difficulty in maintaining a membranous shape. The degree of grafting, ion exchange capacity, water uptake, proton conductivity, methanol permeability, and chemical stability of the polymer electrolyte membrane obtained in the present Comparative Example are shown in Table 1.

Comparative Example 4

DuPont's Nafion 112, which is a perfluorinated polymer electrolyte membrane now in widest use for polymer electrolyte fuel cells, was measured for ion exchange capacity, water uptake, proton conductivity, methanol permeability, chemical stability, and tensile strength, under the above-mentioned conditions. These data are shown in Table 1.

The results in Table 1 show that the polymer electrolyte membranes of the Examples are low in water uptake, satisfactory in proton conductivity, low in methanol permeability, satisfactory in chemical stability, and high in tensile strength, as compared with those of the Comparative Examples.

The crosslinked aromatic polymer electrolyte membrane of the present invention has both of the characteristics of a crosslinked polymer and those of an aromatic polymer. Thus, it is an electrolyte membrane possessing low water uptake, high proton conductivity, low methanol permeability, high chemical stability, and excellent mechanical characteristics. In its manufacturing process, a highly crosslinked structure is imparted beforehand to the aromatic polymer film substrate, or the monomer-grafted aromatic polymer film substrate. Thus, the film substrate can be sulfonated directly in the sulfonating solution. Compared with the methods of the related art including the complicated waste acid treating and membrane-forming steps, therefore, the cost of manufacturing can be markedly reduced. Moreover, the microphase-separated structure of the polymer electrolyte membrane can be designed by selecting the film substrate within a wide range, controlling the degree of sulfonation, or controlling the degree of grafting. Thus, it can be expected to provide a polymer electrolyte membrane optimal for a fuel cell for mobile instruments, a fuel cell for stationary cogeneration systems, or a fuel cell for automobiles, which utilizes methanol, hydrogen or the like as a fuel. The economic effect of the polymer electrolyte membrane is great.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a crosslinked aromatic polymer electrolyte membrane, comprising:
    irradiating an aromatic polymer film substrate with ionizing radiation to impart a crosslinked structure to the aromatic polymer film substrate; and
    then sulfonating the crosslinked aromatic polymer film substrate to produce a crosslinked aromatic polymer electrolyte membrane having sulfonic acid groups introduced into aromatic rings of the crosslinked aromatic polymer film substrate, and
    heat-treating the crosslinked aromatic polymer electrolyte membrane to impart a multiple-crosslinked structure to the crosslinked aromatic polymer electrolyte membrane.

2. The method according to claim 1, wherein the aromatic polymer film substrate is a homopolymer, or has a structure having a monomer grafted to the polymer.

3. The method according to claim 2, wherein the monomer is at least one monomer selected from the group consisting of aromatic vinyl compounds, acrylic acid and derivatives thereof, acrylamides, vinylketones, acrylonitriles, vinyl fluoride-based compounds, and multifunctional monomers.

4. The method according to claim 1, wherein the aromatic polymer film substrate comprises any of polyether ketones, polyimides, polysulfones, polyesters, polycarbonates, polyphenylene sulfides, and polybenzimidazoles, or a composite containing any of the polymers.

* * * * *

UNITED STATES PATENT AND TRADEMARK OFFICE
CERTIFICATE OF CORRECTION

| | | |
|---|---|---|
| PATENT NO. | : 7,714,027 B2 | Page 1 of 1 |
| APPLICATION NO. | : 12/068036 | |
| DATED | : May 11, 2010 | |
| INVENTOR(S) | : Jinhua Chen et al. | |

It is certified that error appears in the above-identified patent and that said Letters Patent is hereby corrected as shown below:

On the Title Page, please insert:

Item -- (30) Foreign Application Priority Data
Feb. 8, 2007   (JP)   .......................2007-029223 --

Signed and Sealed this
Seventh Day of June, 2011

David J. Kappos
*Director of the United States Patent and Trademark Office*